US010902747B2

(12) United States Patent
Alletto, Jr.

(10) Patent No.: US 10,902,747 B2
(45) Date of Patent: Jan. 26, 2021

(54) CFM DISPLAY

(71) Applicant: BEDGEAR, LLC, Farmingdale, NY (US)

(72) Inventor: Eugene Alletto, Jr., Glen Head, NY (US)

(73) Assignee: Bedgear, LLC, Farmingdale, NY (US)

( * ) Notice: Subject to any disclaimer, the term of this patent is extended or adjusted under 35 U.S.C. 154(b) by 346 days.

(21) Appl. No.: 15/913,046

(22) Filed: Mar. 6, 2018

(65) Prior Publication Data
US 2018/0261130 A1 Sep. 13, 2018

Related U.S. Application Data

(60) Provisional application No. 62/469,182, filed on Mar. 9, 2017.

(51) Int. Cl.
G09B 25/00 (2006.01)
G09B 7/06 (2006.01)
A47C 31/12 (2006.01)
G06Q 30/02 (2012.01)
A47F 7/30 (2006.01)

(52) U.S. Cl.
CPC .............. G09B 25/00 (2013.01); A47C 31/12 (2013.01); G06Q 30/0282 (2013.01); G09B 7/06 (2013.01); A47F 7/30 (2013.01)

(58) Field of Classification Search
CPC .......... G09B 25/00; G09B 7/06; A47C 31/12; G06Q 30/0282; A47F 7/30
See application file for complete search history.

(56) References Cited

U.S. PATENT DOCUMENTS 5,429,053 A * 7/1995 Walker ...................... F42B 4/20
102/342
6,006,524 A * 12/1999 Park ...................... A47C 21/044
62/3.7
6,546,576 B1 * 4/2003 Lin ........................ A47C 21/044
5/423
7,240,386 B1 7/2007 McKay
(Continued)

OTHER PUBLICATIONS

International Search Report and Written Opinion of the International Searching Authority dated May 16, 2018 issued in International PCT Application No. PCT/US2018/021085 filed on Mar. 6, 2018.
International Search Report and Written Opinion of the International Searching Authority, European Patent Office, PCT/US2018/021085, dated Sep. 10, 2019.

Primary Examiner — Malina D. Blaise
(74) Attorney, Agent, or Firm — Sorell, Lenna & Schmidt, LLP

(57) ABSTRACT

A system is provided for marketing bedding. The system includes a plurality of air velocity displays each having a body defining a chamber and an opening that is in communication with the chamber, an air flow generator positioned within the chamber, and a sample material that covers the opening such that air flow created by the air flow generator passes through the sample material. The system includes plurality of selection modules. The selection modules each having a user interface that is in communication with one of the air velocity displays such that engaging a feature of one of the user interfaces will cause one of the air flow generators to move from an off position to an on position to create airflow. Methods of use are provided.

20 Claims, 11 Drawing Sheets

(56) References Cited

U.S. PATENT DOCUMENTS

| | | | |
|---|---|---|---|
| 7,509,998 B1* | 3/2009 | Rodney | A47C 21/044 165/138 |
| 8,353,069 B1* | 1/2013 | Miller | A47C 21/044 5/423 |
| 10,667,435 B1* | 5/2020 | Alissa | H05K 7/20727 |
| 2004/0099747 A1* | 5/2004 | Johnson | H05K 7/20736 236/49.3 |
| 2005/0170770 A1* | 8/2005 | Johnson | H05K 7/20736 454/184 |
| 2007/0171613 A1* | 7/2007 | McMahan | H05K 7/20736 361/695 |
| 2007/0298405 A1* | 12/2007 | Ebrom | G09B 25/00 434/365 |
| 2008/0277360 A1 | 11/2008 | Ecker | |
| 2010/0011502 A1* | 1/2010 | Brykalski | A47C 21/04 5/423 |
| 2011/0314837 A1* | 12/2011 | Parish | A47C 21/044 62/3.4 |
| 2014/0137569 A1* | 5/2014 | Parish | F25B 21/02 62/3.2 |
| 2015/0026099 A1 | 1/2015 | Alletto, Jr. | |
| 2015/0121620 A1* | 5/2015 | Aramli | A47C 21/044 5/423 |
| 2015/0320588 A1* | 11/2015 | Connor | A61F 7/0085 607/107 |
| 2018/0080670 A1* | 3/2018 | Carlyon | F24F 11/30 |

* cited by examiner

CFM DISPLAY

TECHNICAL FIELD

The present disclosure generally relates to bedding and more particularly to bed frames that drop in the center to move to a zero gravity position. Methods of use are included.

BACKGROUND

Sleep is critical for people to feel and perform their best, in every aspect of their lives. Sleep is an essential path to better health and reaching personal goals. Indeed, sleep affects everything from the ability to commit new information to memory to weight gain. It is therefore essential for people to use bedding that suit both their personal sleep preference and body type in order to achieve comfortable, restful sleep.

Studies have shown that sleeping on a flat surface is not conducive for restful sleep. Moreover, these studies have shown that sleeping on a flat surface, after a long time, can cause or trigger illnesses such as, for example, migraines, Alzheimer's disease, glaucoma, sleep apnea, stroke, impotency, and similar illnesses. Bed frames have thus been developed that allow the sleep surface of a bed to move from a horizontal position to an inclined position. However, such bed frames do not allow certain sections of the bed frame, such as, for example, a section of the bed frame that supports at least a portion of a sleeper's abdomen, to move relative to other sections of the bed frame, thus limiting the adjustability of the bed frame. This disclosure describes an improvement over these prior art technologies.

SUMMARY

In one embodiment, in accordance with the principles of the present disclosure, a system is provided for marketing bedding. The system includes a plurality of air velocity displays each having a body defining a chamber and an opening that is in communication with the chamber, an air flow generator positioned within the chamber, and a sample material that covers the opening such that air flow created by the air flow generator passes through the sample material. The system includes plurality of selection modules. The selection modules each having a user interface that is in communication with one of the air velocity displays such that engaging a feature of one of the user interfaces will cause one of the air flow generators to move from an off position to an on position to create airflow. In some embodiments, the user interfaces are touch screens and the features of the user interfaces are icons on displays of the touch screens. In some embodiments, the air flow created by each of the air flow generators has the same velocity. In some embodiments, the air flow created by the air flow generators moves through each of the sample materials at a different velocity. In some embodiments, the air flow generators are fans, the fans each comprising a motor that is electrically coupled to one of the user interfaces.

In one embodiment, in accordance with the principles of the present disclosure, the system includes a plurality of air velocity displays each comprising a body defining a chamber and an opening that is in communication with the chamber, an air flow generator positioned within the chamber, and a sample material that covers the opening such that air flow created by the air flow generator passes through the sample material. The system includes a selection module comprising a plurality of buttons that are each in communication with one of the air velocity displays such that pressing one of the buttons will cause one of the air flow generators to move from an off position to an on position to create airflow. In some embodiments, the air flow created by each of the air flow generators has the same velocity. In some embodiments, the air flow created by the air flow generators moves through each of the sample materials at a different velocity. In some embodiments, the air flow generators are fans, the fans each comprising a motor that is electrically coupled to one of the buttons.

In one embodiment, in accordance with the principles of the present disclosure, the system includes an air velocity display comprising a body and a drum defining a chamber and a plurality of openings that are each in communication with the chamber. The air velocity display comprises an air flow generator positioned within the chamber and a plurality of sample materials. The sample materials each cover one of the openings. The drum is rotatable relative to the body such that air flow created by the air flow generator passes through only one of the sample materials at a time. The system includes a selection module comprising a plurality of buttons that each correspond to one of the sample materials. The buttons are each in communication with the air velocity display such that pressing one of the buttons moves the air flow generator from an off position to an on position and rotates the drum relative to the body such that air flow created by the air flow generator passes through the sample material that corresponds to the button that was pressed. In some embodiments, the air flow generator is a fan comprising a motor that is electrically coupled to each of the buttons. In some embodiments, the drum is a cylinder that is rotatable relative to the air flow generator. In some embodiments, the air velocity display comprises a duct having the air flow generator positioned therein such that the duct channels air flow in only one direction, the duct being positioned within the drum such that the drum is rotatable relative to the duct and the air flow generator. In some embodiments, the system includes a rod that is fixed to the body, the rod extending through the drum such that the rod engages the duct in fixed engagement, the drum being rotatable about the rod. In some embodiments, the duct comprises a mating element, such as, for example, an O-ring, that forms an airtight seal with an inner surface of the drum. In some embodiments, the system includes a motor that is coupled to the body and a roller assembly that is coupled to the motor, the drum being positioned on top of the roller assembly, the motor being electrically coupled to the buttons such that pressing one of the buttons causes the motor to rotate the roller assembly to align the duct with the sample material that corresponds to the button that was pressed. In some embodiments, the roller assembly comprises a plurality of roller assemblies.

In one embodiment, in accordance with the principles of the present disclosure, the system includes an air velocity display comprising a body and a drum defining a chamber and a plurality of openings that are each in communication with the chamber. The air velocity display comprises an air flow generator positioned within the chamber and a plurality of sample materials. The sample materials each cover one of the openings. The drum is rotatable relative to the body such that air flow created by the air flow generator passes through only one of the sample materials at a time. The system includes a selection module comprising a user interface that is in communication with the air velocity display such that engaging a feature of the user interface moves the air flow generator from an off position to an on position and rotates the drum relative to the body such that air flow created by the air flow generator passes through the sample material that corresponds to the feature of the user interface. In some embodiments, the user interface comprises a touch screen and the feature of the user interface is an icon on a display of the touch screen. In some embodiments, the air flow generator is a fan comprising a motor that is electrically coupled to the user interface. In some embodiments, the drum is a cylinder that is rotatable relative to the air flow generator. In some embodiments, the air velocity display comprises a duct having the air flow generator positioned therein such that the duct channels air flow in only one direction, the duct being positioned within the drum such that the drum is rotatable relative to the duct and the air flow generator. In some embodiments, the system includes a rod that is fixed to the body, the rod extending through the drum such that the rod engages the duct in fixed engagement, the drum being rotatable about the rod. In some embodiments, the duct comprises a mating element, such as, for example, an O-ring, that forms an airtight seal with an inner surface of the drum. In some embodiments, the system includes a motor that is coupled to the body and a roller assembly that is coupled to the motor, the drum being positioned on top of the roller assembly, the motor being electrically coupled to the buttons such that pressing one of the buttons causes the motor to rotate the roller assembly to align the duct with the sample material that corresponds to the button that was pressed. In some embodiments, the roller assembly comprises a plurality of roller assemblies.

In one embodiment, in accordance with the principles of the present disclosure, a method of marketing bedding is provided that includes: providing a first menu having a group of different body temperatures; selecting one of the body temperatures from the first menu based on a body temperature of a user; providing a second menu having a plurality of materials configured for users having the selected body temperature; testing at least two of the materials from the second menu using a system configured to generate air flow through at least two of the materials; feeling air that flows through at least two of the materials; and selecting an article of bedding that comprises one of the materials from the second menu based on amounts of air that flow through at least two of the materials. In some embodiments, the system used in the method is one or more of the embodiments of the system disclosed herein.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

Reference will now be made in detail to the exemplary embodiments of the present disclosure, which are illustrated in the accompanying figures. Turning to FIGS. 1-11, there are illustrated components of a bedding marketing system 20.

In one embodiment, in accordance with the principles of the present disclosure, system 20 includes a housing 22 that is configured to be coupled to a wall of a building or other structure. In some embodiments, housing 22 is incorporated into the wall. In some embodiments, the wall is a vertical wall such that a front panel 24 of housing 22 is parallel to the vertical wall. System 20 comprises a plurality of air velocity displays 26 that are coupled to housing 22 such that at least a portion of each of displays 26 is viewable through front panel 24.

Figure 2:
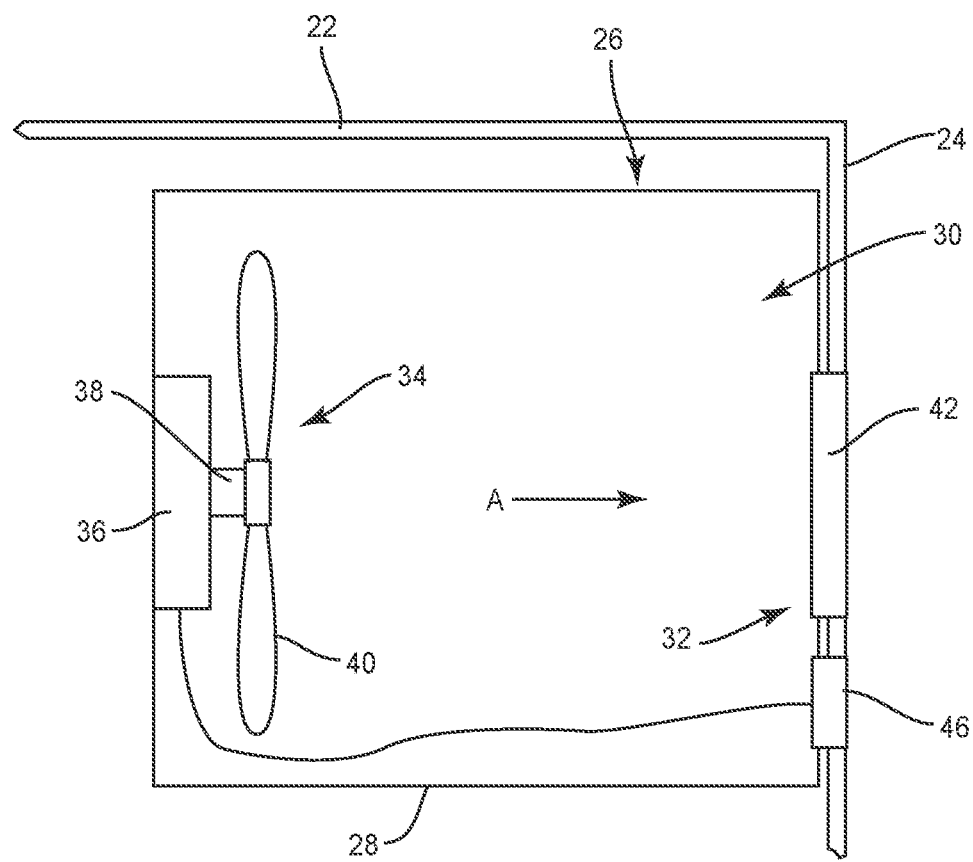
FIG. 2 is a side, cross sectional view of components of the system shown in FIG. 1.

As shown in FIG. 2, displays 26 each include a body 28 defining a chamber 30 and an opening 32 that is in communication with chamber 30. An air flow generator 34 is positioned within chamber 30. In some embodiments, at least one of air flow generators 34 is a fan having a motor 36, a shaft 38 extending from motor 36 and a blade 40 that is fixed to shaft 38. Motor 36 is configured to rotate shaft 38 in a first direction, such as, for example, clockwise and/or a second directions, such as counterclockwise. Since blade 40 is fixed to shaft 38, rotation of shaft 38 also rotates blade 40. As blade 40 rotates in the first direction and/or the second direction, blade creates air flow that moves in the direction shown by arrow A in FIG. 2. In some embodiments, chamber 30 has a uniform diameter along the entire length of body 28. In some embodiments, chamber 30 and/or opening 32 may have various cross section configurations, such as, for example, circular, oval, oblong, triangular, rectangular, square, polygonal, irregular, uniform, non-uniform, variable, tubular and/or tapered.

Displays 26 each include a sample material 42 that covers opening 32 such that air flow created by air flow generator 34 passes through sample material 42. In some embodiments, sample material 42 is fixed to body 28. In some embodiments, sample material 42 is adhered to body 28 using an adhesive and/or curable material, such as, for example an epoxy. In some embodiments, sample material 42 can be variously coupled to body 28, such as, for example, monolithic, integral connection, frictional engagement, threaded engagement, mutual grooves, screws, adhesive, nails, barbs and/or raised element. In some embodiments, sample material 42 is positioned such that an outer surface of sample material 42 is flush with an outer surface of front panel 24, as shown in FIG. 2. In some embodiments, sample material 42 is positioned such that the outer surface of sample material 42 is recessed inwardly from the outer surface of front panel 24.

In some embodiments, at least one of sample materials 42 is made from at least one of acrylic, acetate, cotton, linen, silk, polyester, wool, nylon, rayon, spandex, lycra, manmade materials, natural materials (e.g., hemp) and blends and/or combinations thereof. In some embodiments, each of displays 26 includes a different sample material 42. In some embodiments, at least one of sample materials 42 is made from a material that is different than a material that another one of sample materials 42 is made from. In some embodiments, at least one of sample materials 42 is made entirely from a single material and another one of sample materials 42 is made from a plurality of materials. In some embodiments, at least one of sample materials 42 is made entirely from a single layer and another one of sample materials 42 is made from a plurality of layers. In some embodiments, at least one of sample materials 42 is made from Ver-Tex® material, Dri-Tec® material, Dri-Tec® Lite material, Hyper-Cotton™ material, Boost® material and React® material. In some embodiments, at least one of sample materials 42 is made from a material that air flows through at 150-199 cubic feet per minute (cfm), at least one of sample materials 42 is made from a material that air flows through at 200-399 cfm, at least one of sample materials 42 is made from a material that air flows through at 400-599 cfm, at least one of sample materials 42 is made from a material that air flows through at 600-799 cfm, and at least one of sample materials 42 is made from a material that air flows through at 800-1000 cfm.

Figure 1:
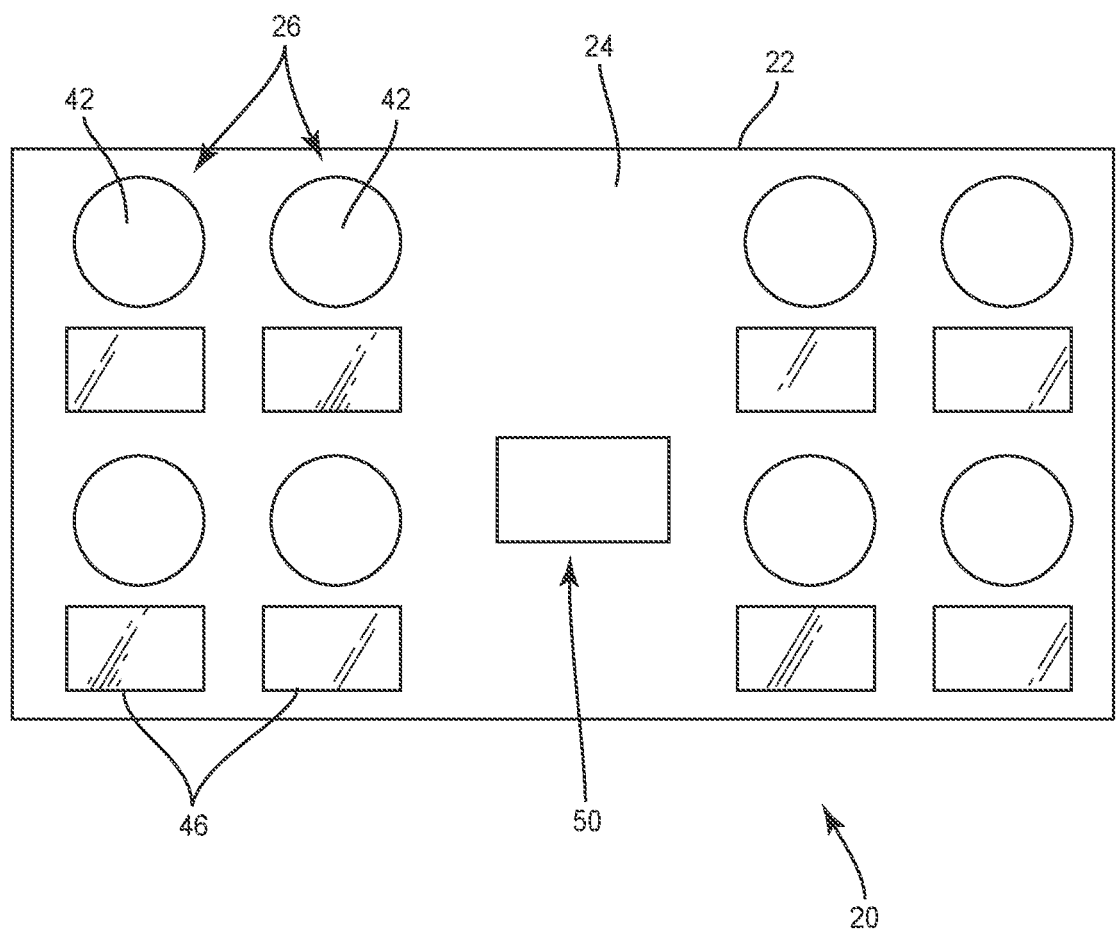
FIG. 1 is a front view of one embodiment of a system for marketing bedding, in accordance with the principles of the present disclosure.
Figure 3:
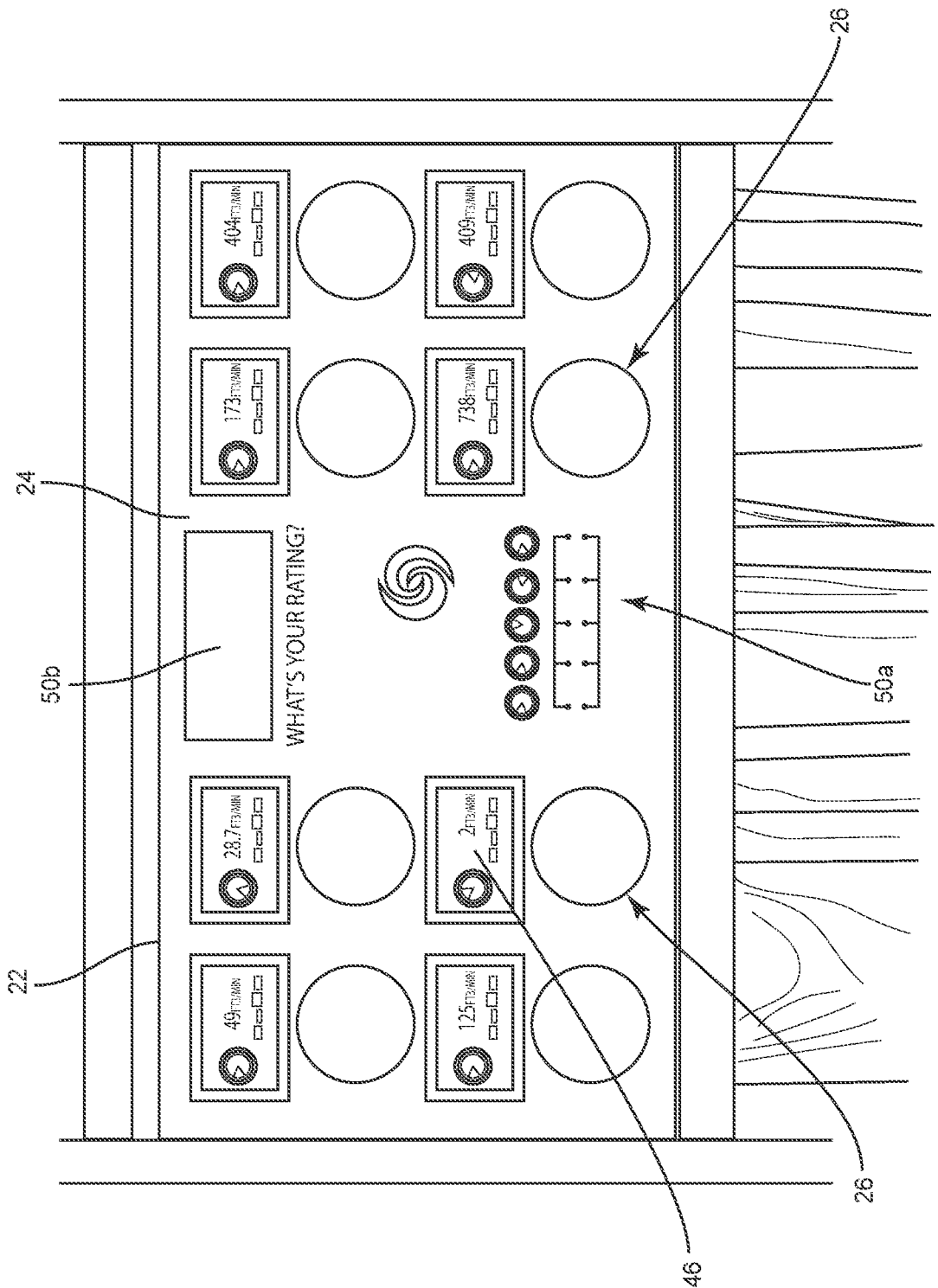
FIG. 3 is a front view of components of the system shown in FIG. 1.

System 20 includes a plurality of selection modules 44. Each selection module 44 is associated with one of displays 26, as discussed herein. Selection modules 44 each include a user interface 46 that is in communication with one of displays 26 such that engaging a feature of one of user interfaces 46 will cause one of air flow generators 34 to move from an off position to an on position to create airflow. In some embodiments, user interfaces 46 each comprise an electronic device, such as, for example, a computer, tablet, smartphone, personal digital assistant or other device having a touchscreen. In such embodiments, the features of user interfaces 46 that the user(s) engage(s) are icons on the touchscreen. In some embodiments, the icons each correspond to one of sample materials 42. For example, the icons may include information about sample materials 42, such as, for example, the names of sample materials 42 and/or characteristics of sample materials 42, such as, for example, the air velocity at which air flows through sample materials 42. In some embodiments, each user interface 46 is positioned below a sample material 42 it is associated with, as shown in FIG. 1. In some embodiments, each user interface 46 is positioned above a sample material 42 it is associated with, as shown in FIG. 3.

User interfaces 56 are each electrically coupled to one of air flow generators 34 by a wire, such as, for example, wire 48 shown in FIG. 2. User interfaces 46 are each operable to send a signal to one of air flow generators 34 via one of wires 48 upon engagement of the feature of a respective on of user interfaces 46. In particular, the signal causes one of air flow generators 34 to move from an off position to an on position. When air flow generators 34 are in the off positions, air flow generators 34 do not create air flow. When air flow generators 34 are in the on positions, air flow generators 34 create air flow. In some embodiments, the signal causes one of air flow generators 34 to move from an off position to an on position such that motor 36 rotates shaft 38 and blade 40 to create air flow within chamber 30 such that air flows through sample material 42. In some embodiments, air flow created by each of air flow generators 34 has the same velocity. In some embodiments, air flow created by air flow generators 34 moves through each of sample materials 42 at a different velocity.

In some embodiments, system 20 comprises indicia 50 relating to a characteristic of at least one of sample materials 42. In some embodiments, indicia 50 is printed on a portion of system 20, such as, for example, on front panel 24. In some embodiments, indicia 50 is presented on a display that is incorporated into system 20, such as, for example, a display of an electrical device, such as, for example, a computer, tablet, smartphone, personal digital assistant. In some embodiments, the display that includes indicia 50 is a touchscreen. In such embodiments, the display that includes indicia 50 may be interactive such that the user can touch an icon on the touchscreen or a portion of the touchscreen to display a menu of options and/or navigate through a series of questions that will assist the user in selecting bedding material, for example. In some embodiments, the display that includes indicia 50 is not a touchscreen. In such embodiments, the display that includes indicia 50 is intended only to provide information and is not capable of changing in response to user input and/or action. In some embodiments, indicia 50 includes letters, words, characters and/or symbols 50a that are printed on front panel 24 and a display 50b that is incorporated into system 20, such as, for example, a display of an electrical device, such as, for example, a computer, tablet, smartphone, personal digital assistant, as shown in FIG. 3. In some embodiments, indicia 50a includes a velocity at which air flows through at least one of sample materials 42 and/or a numerical rating that corresponds to a velocity at which air flows through at least one of sample materials 42.

In operation and use, a user that is in the market for bedding and/or is researching bedding, for example, may approach system 20 such that the user is facing front panel 24. The user may read indicia 50 to learn about different types of materials that are used to make bedding products, the information about the materials being included in indicia 50.

The user may then engage a feature on one or more of user interfaces 46 to move one or more air flow generators 34 from the off position to the on position. In particular, the user will first engage the feature of user interface 46 that is associated with a first one of sample materials 42 to move air flow generator 34 that is associated with the first one of sample materials 42 from the off position to the on position. This will allow the user to feel the amount of air that flows through the first one of sample materials 42.

The user will then engage the feature of user interface 46 that is associated with a second one of sample materials 42 to move air flow generator 34 that is associated with the second one of sample materials 42 from the off position to the on position. This will allow the user to feel the amount of air that flows through the second one of sample materials 42. This may be repeated with additional sample materials 42.

Figure 4:
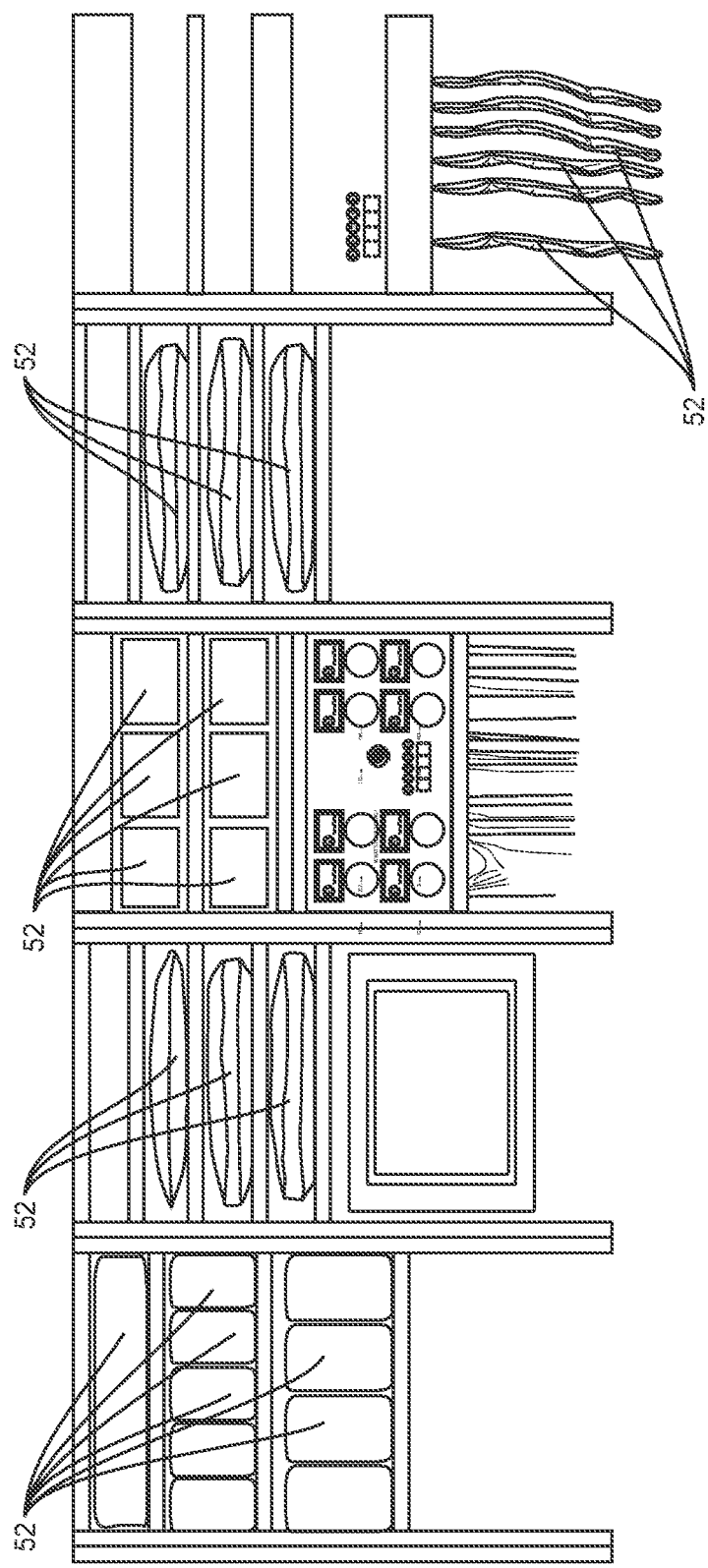
FIG. 4 is a front view of components of the system shown in FIG. 1.

The user may then compare the amount of air that moves through the sample materials 42 that were tested to determine which of sample materials 42 they think would be best suited to their body type, body temperature, sleep position, etc. For example, if the user has a body type wherein he or she feels warm or hot when he or she is sleeping, the user may opt to select sample material 42 that provides the most amount of ventilation and/or provides more ventilation that at least another one sample materials 42. The user may then select an article of bedding 52 that is made from the selected sample material 42. In some embodiments, system 20 includes one or a plurality of articles of bedding 52, such as, for example, one or more bed sheets, blankets, pillows, mattresses and/or mattress toppers. In some embodiments, system 20 comprises shelving for articles of bedding 52, as shown in FIG. 4, for example.

In some embodiments, indicia 50 may guide a user in using system 20 to select one of sample materials 42 that best suits the user. For example, in some embodiments, indicia 50 may include printed instructions for using system 20 to select one of sample materials 42 that best suits the user and/or selecting an article of bedding that is made from the selected one of sample materials 42. In some embodiments, indicia 50 is interactive and provides the user with questions or prompts that the user can answer or select to help the user select one of sample materials 42 that best suits the user. In some embodiments, indicia 50 may include an electronic device having a display, such as, for example, a touchscreen that presents a question to the user when the user approaches system 20. For example, the display/touchscreen may ask the user visually and/or audibly whether the user has a high body temperature, a low body temperature, or a moderate body temperature. The user can answer the question by touching the display/touchscreen and/or speaking. For example, the user may touch a portion of the display/touchscreen that includes information about people with high body temperatures or includes language such as "high body temperature." Indicia may respond by presenting one or a plurality of sample materials 42 that are best adapted for people with high body temperatures.

The user may then test sample materials 42 that are best adapted for people with high body temperatures in the manner discussed above. In particular, the user may engage a feature on user interfaces 46 that is associated with a first one of sample materials 42 that are best adapted for people with high body temperatures to move one of air flow generator 34 from the off position to the on position. For example, the user will first engage the feature of user interface 46 that is associated with the first one of sample materials 42 to move air flow generator 34 that is associated with the first one of sample materials 42 from the off position to the on position. This will allow the user to feel the amount of air that flows through the first one of sample materials 42. The user will then engage the feature of user interface 46 that is associated with a second one of sample materials 42 that are best adapted for people with high body temperatures to move air flow generator 34 that is associated with the second one of sample materials 42 from the off position to the on position. This will allow the user to feel the amount of air that flows through the second one of sample materials 42. This may be repeated with additional sample materials 42. The user may then compare the amount of air that moves through the sample materials 42 that were tested to determine which of sample materials 42 they think would be best suited for them. The user may then select an article of bedding 52 that is made from the selected sample material 42.

Figure 5:
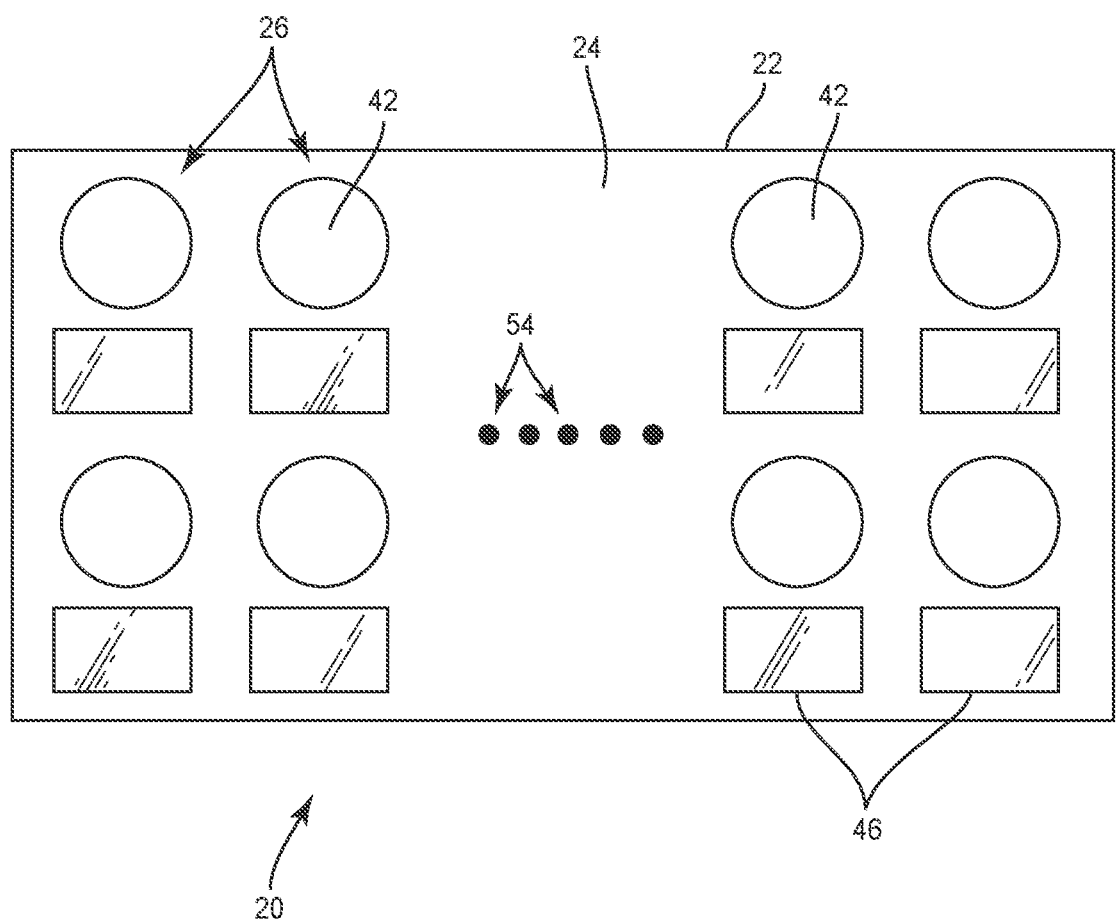
FIG. 5 is a front view of one embodiment of the system shown in FIG. 1, in accordance with the principles of the present disclosure.
Figure 6:
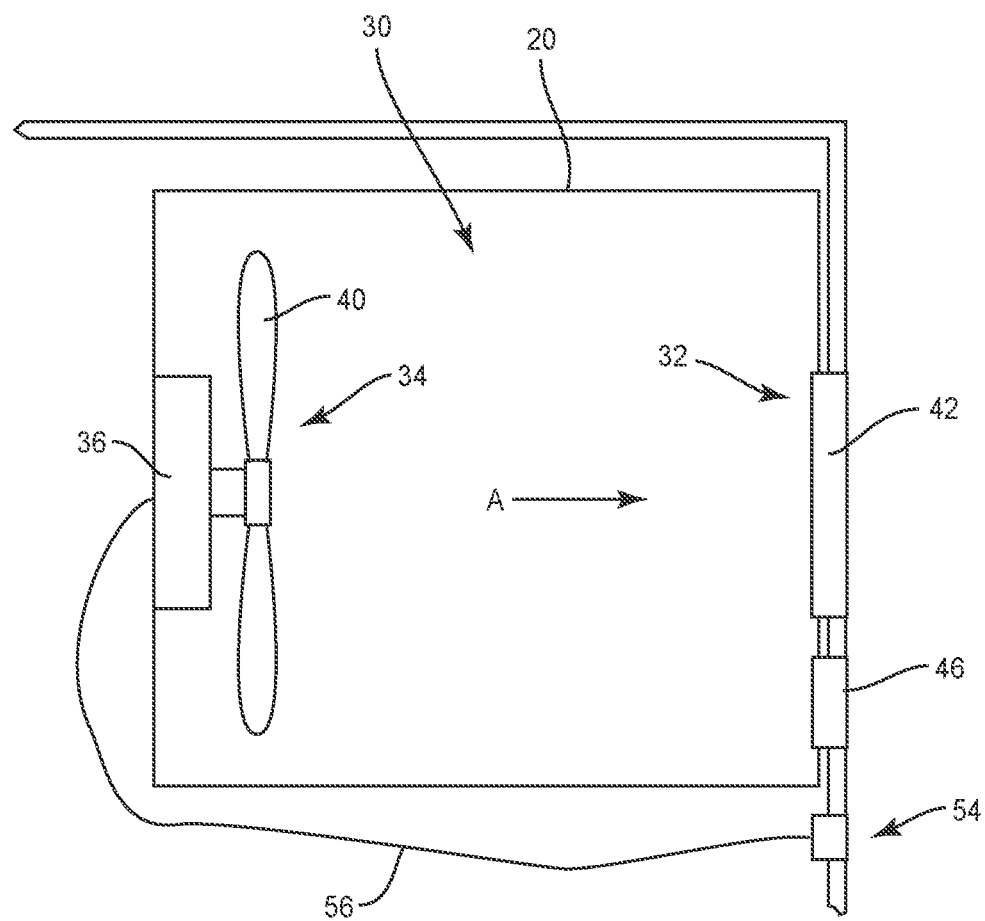
FIG. 6 is a side, cross sectional view of components of the system shown in FIG. 1.

In some embodiments, system 20 includes buttons 54 in place of or in addition to user interfaces 46, as shown in FIGS. 5 and 6. Buttons 54 are configured to move air flow generators 34 from the off positions to the on positions. In particular, buttons 54 are each electronically coupled to one of air flow generators 34 by a wire 56 that connects one of buttons 54 with one of air flow generators 34, as shown in FIG. 6. Buttons 54 are each operable to send a signal to one of air flow generators 34 via one of wires 56 upon pressing one of buttons 54. In particular, the signal causes one of air flow generators 34 to move from an off position to an on position. When air flow generators 34 are in the off positions, air flow generators 34 do not create air flow. When air flow generators 34 are in the on positions, air flow generators 34 create air flow. In some embodiments, the signal causes one of air flow generators 34 to move from an off position to an on position such that motor 36 rotates shaft 38 and blade 40 to create air flow within chamber 30 such that air flows through sample material 42. In some embodiments, air flow created by each of air flow generators 34 has the same velocity. In some embodiments, air flow created by air flow generators 34 moves through each of sample materials 42 at a different velocity.

In operation and use, a user that is in the market for bedding and/or is researching bedding, for example, may approach system 20 such that the user is facing front panel 24. The user may read indicia 50 to learn about different types of materials that are used to make bedding products, the information about the materials being included in indicia 50.

The user may then press one or more of buttons 54 to move one or more air flow generators 34 from the off position to the on position. In particular, the user will first engage button 54 that is associated with a first one of sample materials 42 to move user air flow generator 34 that is associated with the first one of sample materials 42 from the off position to the on position. This will allow the user to feel the amount of air that flows through the first one of sample materials 42.

The user will then engage button 54 that is associated with a second one of sample materials 42 to move air flow generator 34 that is associated with the second one of sample materials 42 from the off position to the on position. This will allow the user to feel the amount of air that flows through the second one of sample materials 42. This may be repeated with additional sample materials 42.

The user may then compare the amount of air that moves through the sample materials 42 that were tested to determine which of sample materials 42 they think would be best suited to their body type, body temperature, sleep position, etc. For example, if the user has a body type wherein he or she feels cool or cold when he or she is sleeping, the user may opt to select sample material 42 that provides the least amount of ventilation and/or provides less ventilation that at least another one sample materials 42. The user may then select an article of bedding 52 that is made from the selected sample material 42. In some embodiments, system 20 includes one or a plurality of articles of bedding 52, such as, for example, one or more bed sheets, blankets, pillows, mattresses and/or mattress toppers.

Figure 7:
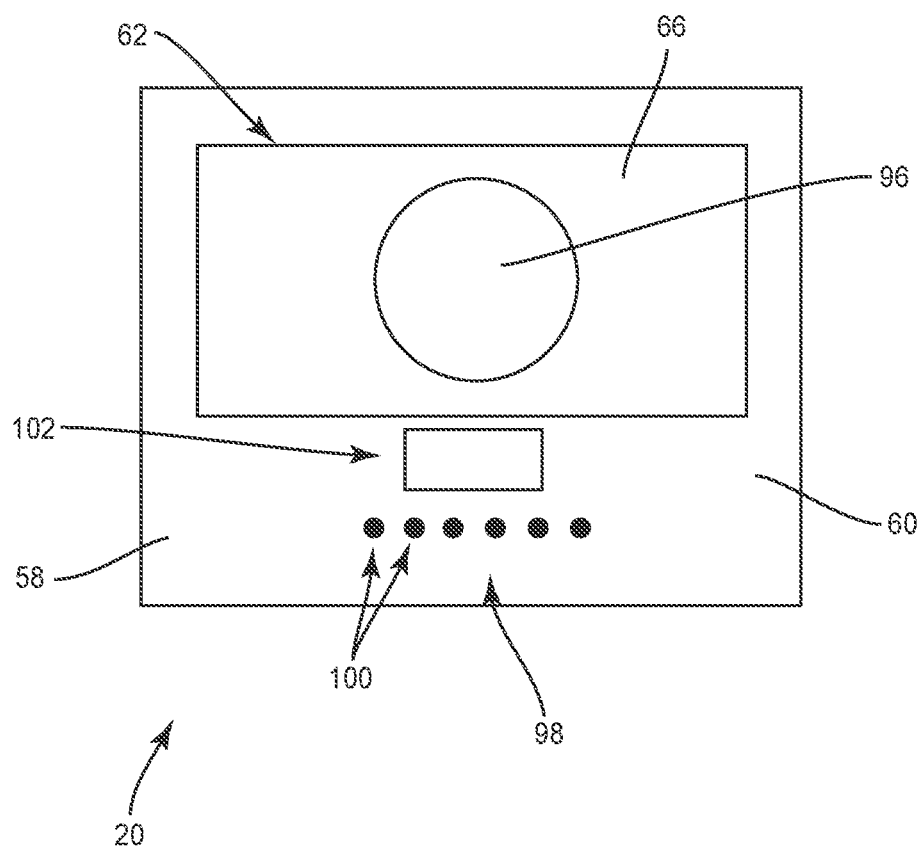
FIG. 7 is a front view of one embodiment of the system shown in FIG. 1, in accordance with the principles of the present disclosure.
Figure 8:
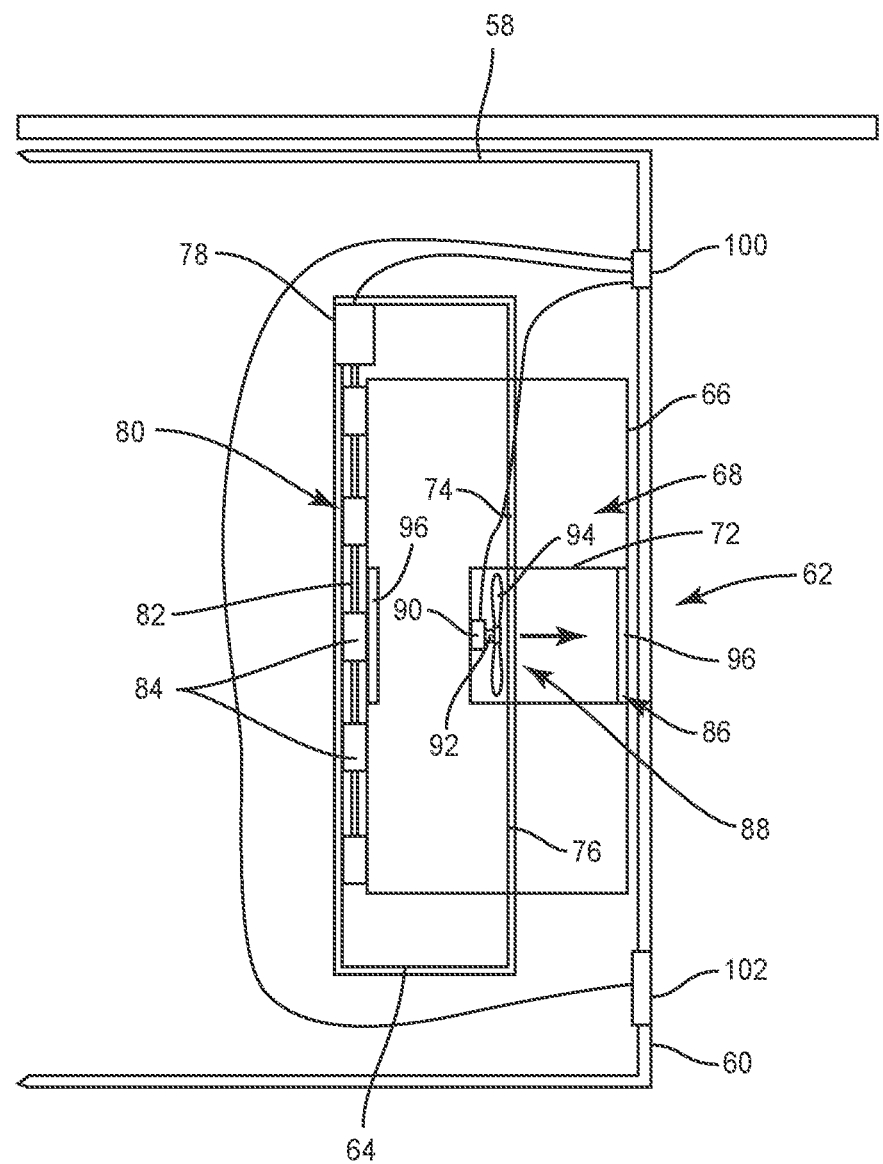
FIG. 8 is a side, cross sectional view of components of the system shown in FIG. 7.
Figure 9:
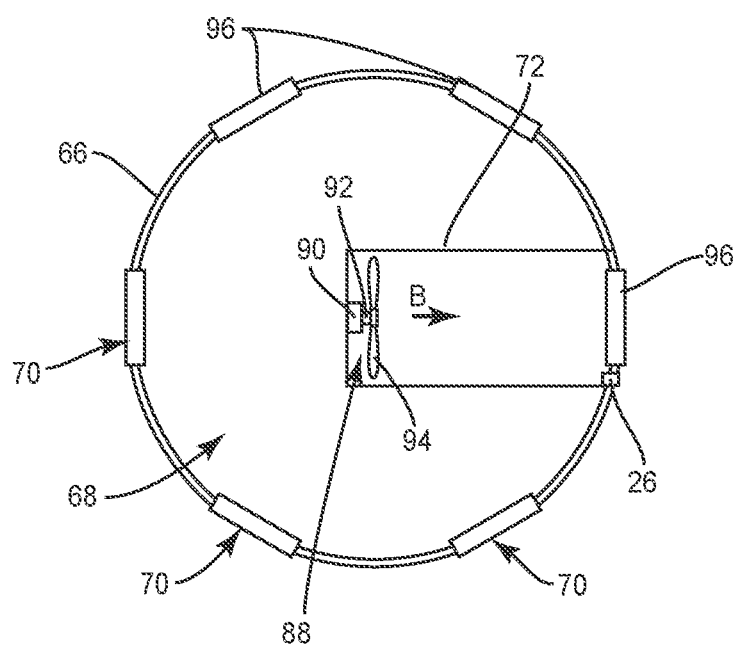
FIG. 9 is a side, cross sectional view of components of the system shown in FIG. 7.

In some embodiments, as shown in FIGS. 7-9, system 20 includes a housing 58 that is similar to housing 22. Housing 58 is configured to be coupled to a wall of a building or other structure. In some embodiments, housing 58 is incorporated into the wall. In some embodiments, the wall is a vertical wall such that a front panel 60 of housing 58 is parallel to the vertical wall. System 20 comprises a single air velocity display 62 that is coupled to housing 58 such that at least a portion display 62 is viewable through front panel 60.

Display 62 includes a body 64 and a cylindrical drum 66 rotatably positioned within body 64. Drum 66 defines a chamber 68 and a plurality of spaced apart openings 70 that are each in communication with chamber 68. A duct 72 is positioned within chamber 68 such that drum 66 is rotatable relative to duct 72. Display 62 includes a rod 74 that that extends between and connects a first side of body 64 with a first side of duct 72 and a rod 76 that extends between and connects a second side of body 64 with a second side of duct 72 such that duct 72 is fixed relative to body 64, as shown in FIG. 8. As such, portions of rods 74, 76 are positioned within drum 66 such that drum 66 is rotatable about rods 74, 76. Display 62 includes one or a plurality of motors 78 positioned within body 64 and a roller assembly 80 that is coupled to motor 78. In particular, roller assembly 80 includes one or a plurality of shafts 82 that is/are coupled to motor(s) 78 and a plurality of rollers 84 positioned along each of shafts 82. Motor(s) 78 is/are operable to rotate shafts 82. Drum 66 is positioned on top of rollers 84 such that rotation of shafts 82 and rollers 84 by motor(s) 78 causes drum 66 to rotate relative to body 64. Duct 72 remains fixed to body 64 as drum 66 rotates relative to body 64. In some embodiments, duct 72 includes a mating element, such as, for example, a seal 86 that engages an inner surface of drum 66 to form an airtight seal. In some embodiments, seal 86 is an O-ring.

An air flow generator 88 is positioned within duct 72. In some embodiments, air flow generator 88 is a fan having a motor 90, a shaft 92 extending from motor 90 and a blade 94 that is fixed to shaft 92. Motor 90 is configured to rotate shaft 92 in a first direction, such as, for example, clockwise and/or a second directions, such as counterclockwise. Since blade 94 is fixed to shaft 92, rotation of shaft 92 also rotates blade 94. As blade 94 rotates in the first direction and/or the second direction, blade 94 creates air flow that moves in the direction shown by arrow B in FIG. 9.

Display 62 includes sample materials 98 that cover openings 70. Sample materials 98 are the same or similar to sample materials 42. Drum 66 rotates relative to body 64 and duct 72 to align duct 72 with one of sample materials 98, as shown in FIGS. 8 and 9 such that air flow created by air flow generator 88 passes through sample material 96 that is aligned with duct 72. In some embodiments, sample materials 96 are fixed to drum 66. In some embodiments, sample materials 96 are adhered to drum 66 using an adhesive and/or curable material, such as, for example an epoxy. In some embodiments, sample materials 96 can be variously coupled to drum 66, such as, for example, monolithic, integral connection, frictional engagement, threaded engagement, mutual grooves, screws, adhesive, nails, barbs and/or raised element. In some embodiments, sample materials 96 are positioned such that outer surfaces of sample materials 96 are flush with an outer surface of front panel 60 when one of sample materials 96 is aligned with duct 72, as shown in FIG. 8. In some embodiments, sample materials 96 are positioned such that the outer surfaces of sample materials 96 are recessed inwardly from the outer surface of front panel 60 when one of sample materials 96 is aligned with duct 72.

In some embodiments, at least one of sample materials 96 is made from at least one of acrylic, acetate, cotton, linen, silk, polyester, wool, nylon, rayon, spandex, lycra, manmade materials, natural materials (e.g., hemp) and blends and/or combinations thereof. In some embodiments, at least one of sample materials 96 is made from a material that is different than a material that another one of sample materials 96 is made from. In some embodiments, at least one of sample materials 96 is made entirely from a single material and another one of sample materials 96 is made from a plurality of materials. In some embodiments, at least one of sample materials 96 is made entirely from a single layer and another one of sample materials 96 is made from a plurality of layers. In some embodiments, at least one of sample materials 96 is made from Ver-Tex® material, Dri-Tec® material, Dri-Tec® Lite material, Hyper-Cotton™ material, Boost® material and React® material. In some embodiments, at least one of sample materials 96 is made from a material that air flows through at 150-199 cubic feet per minute (cfm), at least one of sample materials 96 is made from a material that air flows through at 200-399 cfm, at least one of sample materials 96 is made from a material that air flows through at 400-599 cfm, at least one of sample materials 96 is made from a material that air flows through at 600-799 cfm, and at least one of sample materials 96 is made from a material that air flows through at 800-1000 cfm.

System 20 includes a single selection module 96 that includes a plurality of buttons 100 that are each associated with one of sample materials 96. In particular, buttons 100 are each electrically coupled to motors 78, 90 such that pressing a first one of buttons 100 will cause motor 78 to move from an off position to an on position to rotate drum 66 relative to body 64 and duct 72 such that duct 72 is aligned with sample material 96 that is associated with the first one of buttons 100. Pressing the first one of buttons 100 will also cause motor 90 to move from an off position to an on position such that air flow generator 88 creates air flow through sample material 96 that is associated with the first one of buttons 100. Likewise, pressing a second one of buttons 100 will cause motor 78 to move from the off position to the on position to rotate drum 66 relative to body 64 and duct 72 such that duct 72 is aligned with sample material 96 that is associated with the second one of buttons 100. Pressing the second one of buttons 100 will also cause motor 90 to move from the off position to the on position such that air flow generator 88 creates air flow through sample material 96 that is associated with the second one of buttons 100. In some embodiments, system 20 includes a processor that is in communication with buttons 100 and motor 78 to calibrate rotation of drum 66 relative to body 64 such that pressing one of buttons 100 will rotate drum 66 relative to body 64 and duct 72 such that duct 72 is aligned with sample material 96 that is associated with button 100 that was pressed.

In some embodiments, system 20 comprises indicia 102 relating to a characteristic of at least one of sample materials 96. Indicia 102 may be the same or similar to indicia 50. In some embodiments, indicia 102 is printed on a portion of system 20, such as, for example, on front panel 60. In some embodiments, indicia 102 is presented on a display that is incorporated into system 20, such as, for example, a display of an electrical device, such as, for example, a computer, tablet, smartphone, personal digital assistant. In some embodiments, the display that includes indicia 102 is a touchscreen. In such embodiments, the display that includes indicia 102 may be interactive such that the user can touch an icon on the touchscreen or a portion of the touchscreen to display a menu of options and/or navigate through a series of questions that will assist the user in selecting bedding material, for example. In some embodiments, the display that includes indicia 102 is not a touchscreen. In such embodiments, the display that includes indicia 102 is intended only to provide information and is not capable of changing in response to user input and/or action. In some embodiments, indicia 102 includes letters, words, characters and/or symbols that are printed on front panel 102 and/or a display that is incorporated into system 20, such as, for example, a display of an electrical device, such as, for example, a computer, tablet, smartphone, personal digital assistant. In some embodiments, indicia 102 includes a velocity at which air flows through at least one of sample materials 96 and/or a numerical rating that corresponds to a velocity at which air flows through at least one of sample materials 96. In some embodiments wherein indicia 102 is a display/touchscreen, the display/touchscreen may be electrically coupled to one or more of buttons 100, as shown in FIG. 8. In such embodiments, pressing one of buttons 100 will cause indicia 102 to display information about sample material 96 that is associated with button 100 that was pressed.

In operation and use, a user that is in the market for bedding and/or is researching bedding, for example, may approach system 20 such that the user is facing front panel 60. The user may read indicia 102 to learn about different types of materials that are used to make bedding products, the information about the materials being included in indicia 102. The user may press one or more of buttons 100 to rotate drum 66 relative to body 64 and duct 72 such that duct 72 is aligned with sample material 96 that is associated with button(s) 100 that was/were pressed. For example, when a first one of buttons 100 that is associated with a first one of sample materials 96 is pressed, drum 66 rotates relative to body 64 and duct 72 in the manner discussed herein until duct 72 is aligned with the first one of sample materials 96. Pressing the first one of buttons 100 also causes air flow generator 88 to move from the off position to the on position to create air flow such that air will move through the first one of sample materials 96. This will allow the user to feel the amount of air that flows through the first one of sample materials 96.

The user will then press a second one of buttons 100 that is associated with a second one of sample materials 96 to rotate drum 66 relative to body 64 and duct 72 in the manner discussed herein until duct 72 is aligned with the second one of sample materials 96. Pressing the second one of buttons 100 also causes air flow generator 88 to move from the off position to the on position to create air flow such that air will move through the second one of sample materials 96. This will allow the user to feel the amount of air that flows through the second one of sample materials 96. This may be repeated with additional sample materials 96 by pressing one or more of buttons 100 that is/are associated with one of the additional sample materials 96.

The user may then compare the amount of air that moves through the sample materials 96 that were tested to determine which of sample materials 96 they think would be best suited to their body type, body temperature, sleep position, etc. For example, if the user has a body type wherein he or she feels warm or hot when he or she is sleeping, the user may opt to select sample material 96 that provides the most amount of ventilation and/or provides more ventilation that at least another one sample materials 96. The user may then select an article of bedding 52 that is made from the selected sample material 96.

In some embodiments, indicia 102 may guide a user in using system 20 to select one of sample materials 96 that best suits the user. For example, in some embodiments, indicia 102 may include printed instructions for using system 20 to select one of sample materials 96 that best suits the user and/or selecting an article of bedding that is made from the selected one of sample materials 96. In some embodiments, indicia 102 is interactive and provides the user with questions or prompts that the user can answer or select to help the user select one of sample materials 96 that best suits the user. In some embodiments, indicia 102 may include an electronic device having a display, such as, for example, a touchscreen that presents a question to the user when the user approaches system 20. For example, the display/touchscreen may ask the user visually and/or audibly whether the user has a high body temperature, a low body temperature, or a moderate body temperature. The user can answer the question by touching the display/touchscreen and/or speaking. For example, the user may touch a portion of the display/touchscreen that includes information about people with high body temperatures or includes language such as "high body temperature." Indicia 102 may respond by presenting one or a plurality of sample materials 96 that are best adapted for people with high body temperatures, such as, for example, sample materials 96 that have greater permeability/breathability than other ones of sample materials 96. The user may then test sample materials 96 that are best adapted for people with high body temperatures in the manner discussed above. The user may then select an article of bedding 52 that is made from the selected sample material 96.

Figure 10:
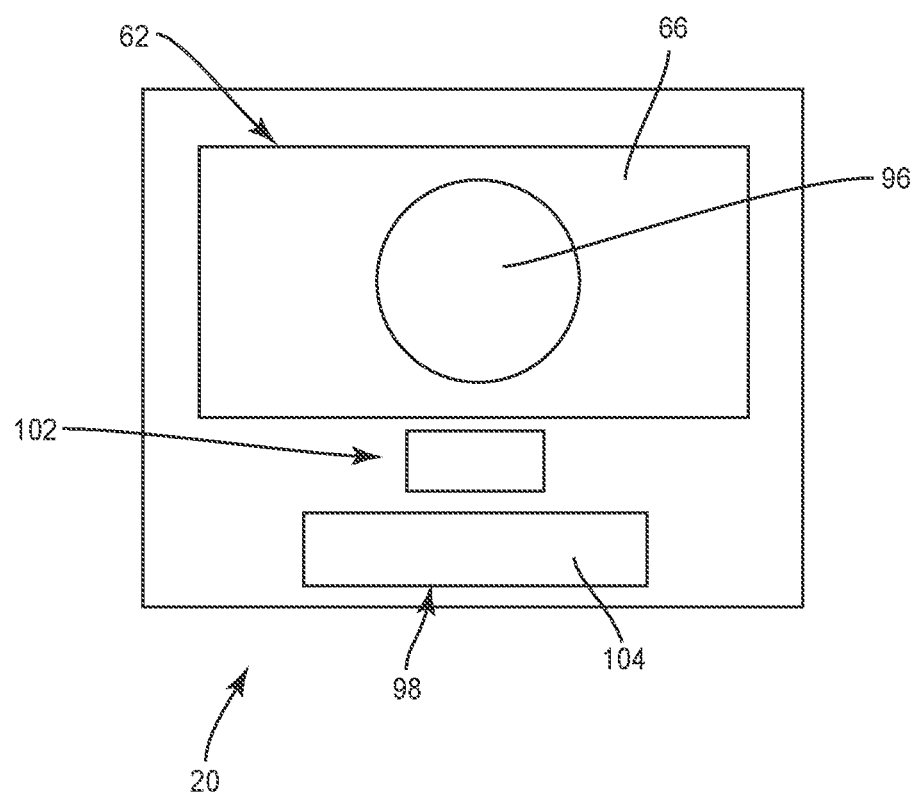
FIG. 10 is a front view of one embodiment of the system shown in FIG. 1, in accordance with the principles of the present disclosure.
Figure 11:
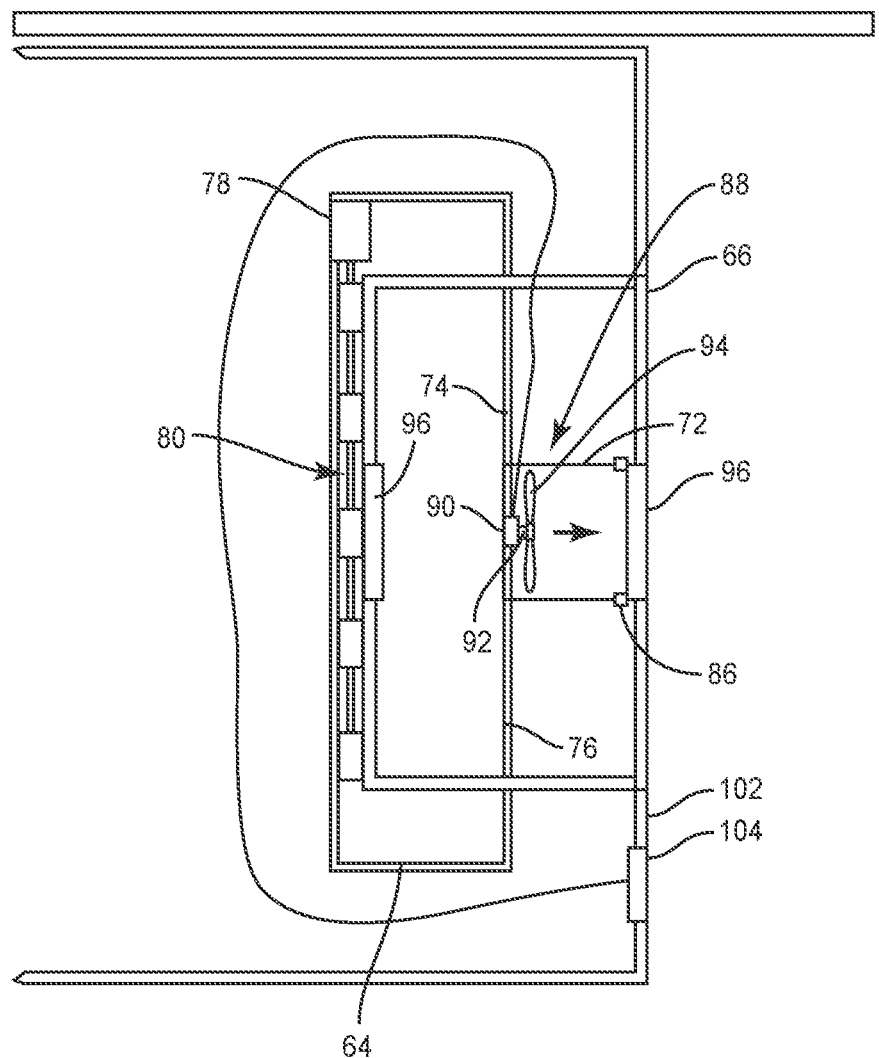
FIG. 11 is a side, cross sectional view of components of the system shown in FIG. 10.

In some embodiments, selection module 98 includes a user interface 104 in place of or in addition to buttons 100, as shown in FIGS. 10 and 11. In some embodiments, user interface 104 is a computer, tablet, smartphone, personal digital assistant or other device having a touchscreen. In such embodiments, user interface 104 is electrically coupled to motors 78, 90 such that engaging a feature of user interface 104 causes drum 66 to rotate relative to body 64 and duct 72 such that duct 72 is aligned with sample material 96 that is associated with the feature of user interface 104 that was engaged. For example, when a first feature of user interface 104 that is associated with a first one of sample materials 96 is pressed or otherwise engaged, drum 66 rotates relative to body 64 and duct 72 in the manner discussed herein until duct 72 is aligned with the first one of sample materials 96. Engaging the first feature of user interface 104 also causes air flow generator 88 to move from the off position to the on position to create air flow such that air will move through the first one of sample materials 96. Likewise, when a second feature of user interface 104 that is associated with a second one of sample materials 96 is pressed or otherwise engaged, drum 66 rotates relative to body 64 and duct 72 in the manner discussed herein until duct 72 is aligned with the second one of sample materials 96. Engaging the second feature of user interface 104 also causes air flow generator 88 to move from the off position to the on position to create air flow such that air will move through the second one of sample materials 96.

In some embodiments, the features of user interfaces 104 that the user(s) engage(s) are icons on the touchscreen. In some embodiments, the icons each correspond to one of sample materials 96. For example, the icons may include information about sample materials 96, such as, for example, the names of sample materials 96 and/or characteristics of sample materials 96, such as, for example, the air velocity at which air flows through sample materials 96. In some embodiments, includes a processor that is configured to calibrate rotation of drum 66 relative to body 64 such that engaging a feature of user interface 104 will rotate drum 66 relative to body 64 and duct 72 such that duct 72 is aligned with sample material 96 that is associated with the feature of user interface that was pressed or otherwise engaged.

In operation and use, a user that is in the market for bedding and/or is researching bedding, for example, may approach system 20 such that the user is facing front panel 60. The user may read indicia 102 to learn about different types of materials that are used to make bedding products, the information about the materials being included in indicia 102. The user may press engage one or more features on the touchscreen of user interface 104 to rotate drum 66 relative to body 64 and duct 72 such that duct 72 is aligned with sample material 96 that is associated with the feature of the touchscreen that was pressed or otherwise engaged. For example, when a first feature of the touchscreen of user interface 104 that is associated with a first one of sample materials 96 is pressed, drum 66 rotates relative to body 64 and duct 72 in the manner discussed herein until duct 72 is aligned with the first one of sample materials 96. Pressing the first feature of the touchscreen of user interface 104 also causes air flow generator 88 to move from the off position to the on position to create air flow such that air will move through the first one of sample materials 96. This will allow the user to feel the amount of air that flows through the first one of sample materials 96.

The user will then press a second feature of the touchscreen of user interface 104 that is associated with a second one of sample materials 96 to rotate drum 66 relative to body 64 and duct 72 in the manner discussed herein until duct 72 is aligned with the second one of sample materials 96. Pressing the second feature of the touchscreen of user interface 104 also causes air flow generator 88 to move from the off position to the on position to create air flow such that air will move through the second one of sample materials 96. This will allow the user to feel the amount of air that flows through the second one of sample materials 96. This may be repeated with additional sample materials 96 by pressing one or more of additional features of the touchscreen of user interface 104 that is/are associated with one of the additional sample materials 96.

The user may then compare the amount of air that moves through the sample materials 96 that were tested to determine which of sample materials 96 they think would be best suited to their body type, body temperature, sleep position, etc. For example, if the user has a body type wherein he or she feels cool or cold when he or she is sleeping, the user may opt to select sample material 96 that provides the least amount of ventilation and/or provides less ventilation that at least another one sample materials 96. The user may then select an article of bedding 52 that is made from the selected sample material 96.

It will be understood that various modifications may be made to the embodiments disclosed herein. For example, features of any one embodiment can be combined with features of any other embodiment. Therefore, the above description should not be construed as limiting, but merely as exemplification of the various embodiments. Those skilled in the art will envision other modifications within the scope and spirit of the claims appended hereto.

What is claimed is:

1. A system for marketing bedding, the system comprising:
   a plurality of air velocity displays each comprising:
      a body defining a chamber and an opening that is in communication with the chamber,
      an air flow generator positioned within the chamber, and
      a sample material fixed to the body such that the sample material covers the opening and air flow created by the air flow generator passes through the sample material; and
   a plurality of selection modules, the selection modules each comprising a user interface that is in communication with one of the air velocity displays such that engaging a feature of one of the user interfaces will cause one of the air flow generators to move from an off position to an on position to create airflow.

2. A system as recited in claim 1, wherein the user interfaces are touch screens and the features of the user interfaces are icons on displays of the touch screens.

3. A system as recited in claim 1, wherein:
   the air flow created by each of the air flow generators has the same velocity; and
   the air flow created by the air flow generators moves through each of the sample materials at a different velocity.

4. A system as recited in claim 1, wherein the air flow generators are fans, the fans each comprising a motor that is electrically coupled to one of the user interfaces.

5. A system as recited in claim 1, wherein:
   air flows through one of the sample materials at 150-199 cubic feet per minute (cfm);
   air flows through one of the sample materials at 200-399 cfm;
   air flows through one of the sample materials at 400-599 cfm;
   air flows through one of the sample materials at 600-799 cfm; and
   air flows through one of the sample materials at 800-1000 cfm.

6. A system as recited in claim 5, further comprising:
   a first article of bedding configured such that air moves through the first article of bedding at 150-199 cfm;
   a second article of bedding configured such that air moves through the second article of bedding at 200-399 cfm;
   a third article of bedding configured such that air moves through the third article of bedding at 400-599 cfm;
   a fourth article of bedding configured such that air moves through the fourth article of bedding at 600-799 cfm; and
   a fifth article of bedding configured such that air moves through the fifth article of bedding at 800-1000 cfm.

7. A system as recited in claim 6, wherein the articles of bedding are each selected from a group consisting of bed sheets, blankets, pillows, mattresses and mattress toppers.

8. A system as recited in claim 1, wherein the sample material is fixed to the body by an adhesive.

9. A system as recited in claim 1, further comprising indicia relating to a characteristic of at least one of the sample materials, wherein the characteristic is a velocity at which air flows through at least one of the sample materials.

10. A system as recited in claim 1, further comprising indicia relating to a characteristic of at least one of the sample materials, wherein the characteristic is a numerical rating that correspond to a velocity at which air flows through at least one of the sample materials.

11. A system for marketing bedding, the system comprising:
a housing defining a chamber, the housing comprising a first opening and a second opening, the openings each being in communication with the chamber;
spaced apart first and second fans positioned within the chamber;
a first sample material fixed to the housing by adhesive such that the first sample material covers the first opening and air flow created by the first fan passes through the first sample material;
a second sample material fixed to the housing by adhesive such that the second sample material covers the second opening and air flow created by the second fan passes through the second sample material; and
spaced apart first and second selection modules, the first selection module being in communication with the first fan such that engaging the first selection module will cause the first fan to move from an off position to an on position to create airflow, the second selection module being in communication with the second fan such that engaging the second selection module will cause the second fan to move from an off position to an on position to create airflow.

12. A system as recited in claim 11, wherein the first sample of material is different than the second sample of material.

13. A system as recited in claim 11, wherein:
the first sample of material is different than the second sample of material;
the airflow created by each of the fans has the same velocity; and
the airflow created by the first fan moves through the first sample material at a different velocity than the airflow created by the second fan moves through the second sample material.

14. A system as recited in claim 11, further comprising:
first indicia coupled to the frame and comprising information about a characteristic of the first sample material; and
second indicia coupled to the frame and comprising information about a characteristic of the second sample material.

15. A system as recited in claim 14, wherein:
the characteristic of the first sample material is a name of the first sample material; and
the characteristic of the second sample material is a name of the second sample material.

16. A system as recited in claim 14, wherein:
the characteristic of the first sample material is an air velocity at which air flows through the first sample material; and
the characteristic of the second sample material is an air velocity at which air flows through the second sample material.

17. A system as recited in claim 14, wherein:
the characteristic of the first sample material is a numerical rating that corresponds to a velocity at which air flows through the first sample material; and
the characteristic of the second sample material is a numerical rating that corresponds to a velocity at which air flows through the second sample material.

18. A system for marketing bedding, the system comprising:
a housing defining a chamber, the housing comprising a first opening and a second opening, the openings each being in communication with the chamber;
spaced apart first and second fans positioned within the chamber;
a first sample material that covers the first opening such that air flow created by the first fan passes through the first sample material, the first sample material being made from a first material that allows airflow therethrough at a first cubic feet per minute (cfm);
a second sample material that covers the second opening such that air flow created by the second fan passes through the second sample material, the second sample material being made from a first material that allows airflow therethrough at a second cfm, the second cfm being different than the first cfm; and
spaced apart first and second selection modules, the first selection module being in communication with the first fan such that engaging the first selection module will cause the first fan to move from an off position to an on position to create airflow, the second selection module being in communication with the second fan such that engaging the second selection module will cause the second fan to move from an off position to an on position to create airflow.

19. A system as recited in claim 18, wherein the first cfm is 150-199 and the second cfm is 800-1000.

20. A system as recited in claim 18, wherein the first cfm is 400-599 and the second cfm is 800-1000.

* * * * *